US006835789B1

(12) United States Patent
Kneafsey et al.

(10) Patent No.: US 6,835,789 B1
(45) Date of Patent: Dec. 28, 2004

(54) CYANOACRYLATE COMPOSITIONS

(75) Inventors: Brendan J. Kneafsey, County Dublin (IE); Ruth A. Kelly, Dublin (IE); Fergal W. Tierney, County Kildare (IE); David P. Birkett, County Kildare (IE); Hanns R. Misiak, Dublin (IE); Kieran Mulcahy, County Kildare (IE); Harry J. Woolfson, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 71 days.

(21) Appl. No.: 10/463,461

(22) Filed: Jun. 18, 2003

(51) Int. Cl.[7] .................................................. C08F 20/42
(52) U.S. Cl. ..................... 526/307.3; 526/209; 526/213; 526/89; 526/412; 524/556; 524/555
(58) Field of Search .......................... 526/307.3, 209, 526/213, 89, 412; 524/556, 555

(56) References Cited

U.S. PATENT DOCUMENTS

| | | | |
|---|---|---|---|
| 4,556,700 A | 12/1985 | Harris et al. ................. | 526/209 |
| 4,622,414 A | 11/1986 | McKervey .................... | 560/61 |
| 4,636,539 A | 1/1987 | Harris et al. ................. | 523/214 |
| 4,695,615 A | 9/1987 | Leonard et al. .............. | 526/194 |
| 4,718,966 A | 1/1988 | Harris et al. ............. | 156/331.2 |
| 4,837,260 A | 6/1989 | Sato et al. ................... | 524/261 |
| 4,855,461 A | 8/1989 | Harris ......................... | 549/348 |
| 4,906,317 A | 3/1990 | Liu .......................... | 156/307.3 |
| 5,312,864 A | 5/1994 | Wenz et al. ................. | 524/716 |
| 6,294,629 B1 | 9/2001 | O'Dwyer et al. ............ | 526/297 |
| 6,475,331 B1 | 11/2002 | O'Connor et al. ....... | 156/331.2 |
| 2001/0004655 A1 * | 6/2001 | Takahashi et al. .......... | 524/765 |

OTHER PUBLICATIONS

H.W. Coover, D.W. Dreifus, J.T. O'Connor, "Cyanoacrlate Adhesives", *Handbook of Adhesives*, 3rd ed., 27, I. Skeist, ed., Van Nostrand Reinhold, NY (1990), pp. 463–477.

G.H. Millet, "Cyanoacrlate Adhesives", *Structural Adhesives: Chem and Tech.*, S.R. Hartshorn Press, NY (1986), pp. 249–307.

* cited by examiner

*Primary Examiner*—David W. Wu
*Assistant Examiner*—Satya Sastri
(74) *Attorney, Agent, or Firm*—Steven C. Bauman

(57) ABSTRACT

This invention relates to cyanoacrylate-containing compositions that include, in addition to the cyanoacrylate component, certain accelerators to improve fixture speeds on certain substrates.

13 Claims, 1 Drawing Sheet

CYANOACRYLATE COMPOSITIONS

BACKGROUND OF THE INVENTION

1. Field of the Invention

This invention relates to cyanoacrylate-containing compositions that include, in addition to the cyanoacrylate component, a certain accelerator to improve fixture speeds on certain substrates.

2. Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990). See also G. H. Millet "Cyanoacrylate Adhesives" in *Structural Adhesives: Chemistry and Technology*, S. R. Hartshorn, ed., Plenun Press, New York, p. 249–307 (1986).

Nonetheless, various techniques have been used to improve further the fixture times of such adhesive compositions for certain applications where it is important to be able to secure one substrate to another quickly, while allowing the bond strength to develop over time. In addition, substrates constructed of certain materials have proven in the past difficult to bond, irrespective of the application to which the adhesive and the substrate are to be placed.

To combat these issues, Henkel Loctite Corporation [then Loctite Corporation, at least in part through its Loctite (Ireland) Ltd. affiliate] developed a technology based on calixarene and oxacalixarene compounds. Generally, the addition of such materials to a cyanoacrylate allow for accelerated fixturing of substrates to-be-bonded together. See U.S. Pat. Nos. 4,556,700, 4,622,414, 4,636,539, 4,695,615, 4,718,966, and 4,855,461.

In addition to calixarene compounds, Henkel Loctite Corporation also developed technology based on the addition of silacrown compounds to cyanoacrylate adhesive compositions to accelerate fixturing. For instance, U.S. Pat. No. 4,906,317 (Liu) is directed to cyanoacrylate adhesive compositions which include silacrown compounds as additives to give substantially reduced fixture and cure times on de-activating substrates such as wood. The silacrown compounds are preferably employed at levels of about 0.1–5% by weight of the composition.

Henkel KGaA developed technology based on the addition to cyanoacrylate compositions of cyclodextrins to accelerate fixturing. In U.S. Pat. No. 5,312,864 (Wenz), the acceleration of the setting properties of a cyanoacrylate adhesive composition by adding thereto a hydroxyl group derivative of an α-, β- or γ-cyclodextrin which is at least partly soluble in the cyanoacrylate is described.

Other approaches have also been investigated, such as in U.S. Pat. No. 4,837,260 (Sato), in which it is reported the use of crown ethers in cyanoacrylate adhesive compositions.

More recently, Loctite (R&D) Ltd. investigated other ways in which to accelerate the curing of cyanoacrylate adhesive compositions. In U.S. Pat. No. 6,294,629 (O'Dwyer), a cyanoacrylate adhesive composition is provided with a first accelerator component selected from calixarenes and oxacalixarenes, silacrowns, cyclodextrins, crown ethers, and combinations thereof; and a second accelerator component selected from poly(ethyleneglycol) di(meth)acrylates, ethoxylated hydric compounds, and combinations thereof.

And Henkel Loctite Corporation developed a cyanoacrylate adhesive composition, based on a cyanoacrylate component; and an accelerator component consisting essentially of (i) calixarenes, oxcalixarenes, or a combination thereof, and (ii) at least one crown ether, where the composition exhibits a fixturing speed of less than 20 seconds for bonding two substrates, at least one of which is constructed of a material selected from steel, epoxy glass or balsawood, as described in U.S. Pat. No. 6,475,331 (O'Connor).

Notwithstanding the state-of-the-technology it would be desirable to provide alternative technologies to improve the fixturing speed of cyancacrylates.

SUMMARY OF THE INVENTION

The present invention is directed to a cyanoacrylate-based composition, which includes beyond the cyanoacrylate component,

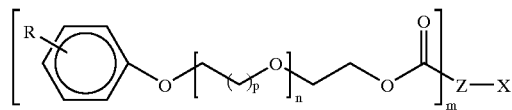

I, as an accelerator, where R is hydrogen, alkyl, alkyloxy, alkyl thioethers, haloalkyl, carboxylic acid and esters thereof, sulfinic, sulfonic and sulfurous acids and esters, phosphinic, phosphonic and phosphorous acids and esters thereof, X is optional, but when present is an aliphatic or aromatic hydrocarbyl linkage, which may be substituted by oxygen or sulfur, and Z is a single or double bond, such as

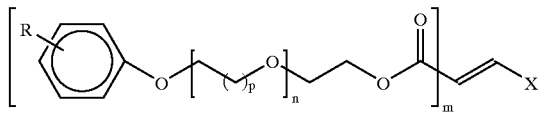

II, where R and X are as defined above, and n is 1–12, m is 1–4, and p is 1–3.

For instance, a particularly desirable chemical class embraced by these structures is

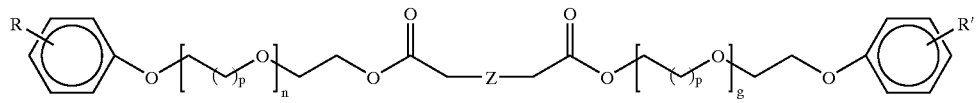

III, where R, Z and n are as defined above, and R' is the same

A particularly desirable chemical within this class as an accelerator component is

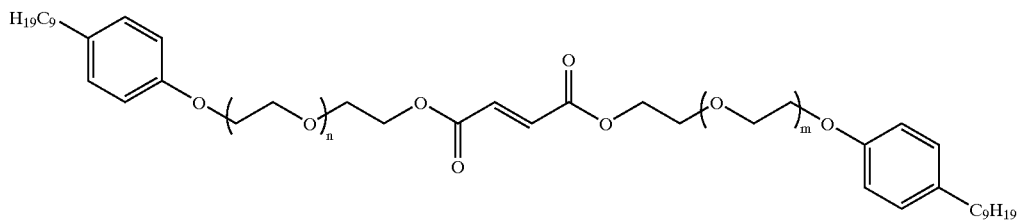

IV, where n and m combined is greater than or equal to 12.

The inclusion of these accelerators into a cyanoacrylate composition provides for a demonstrated improved fixture speeds, particularly on substrates constructed of certain woods, and ceramic and combinations thereof, without sacrificing shelf life.

This invention is also directed to a method of bonding together two substrates, at least one of which is constructed of certain woods, and ceramic, and combinations thereof. The method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description of the Invention", which follows.

DETAILED DESCRIPTION OF THE INVENTION

Figure 1:
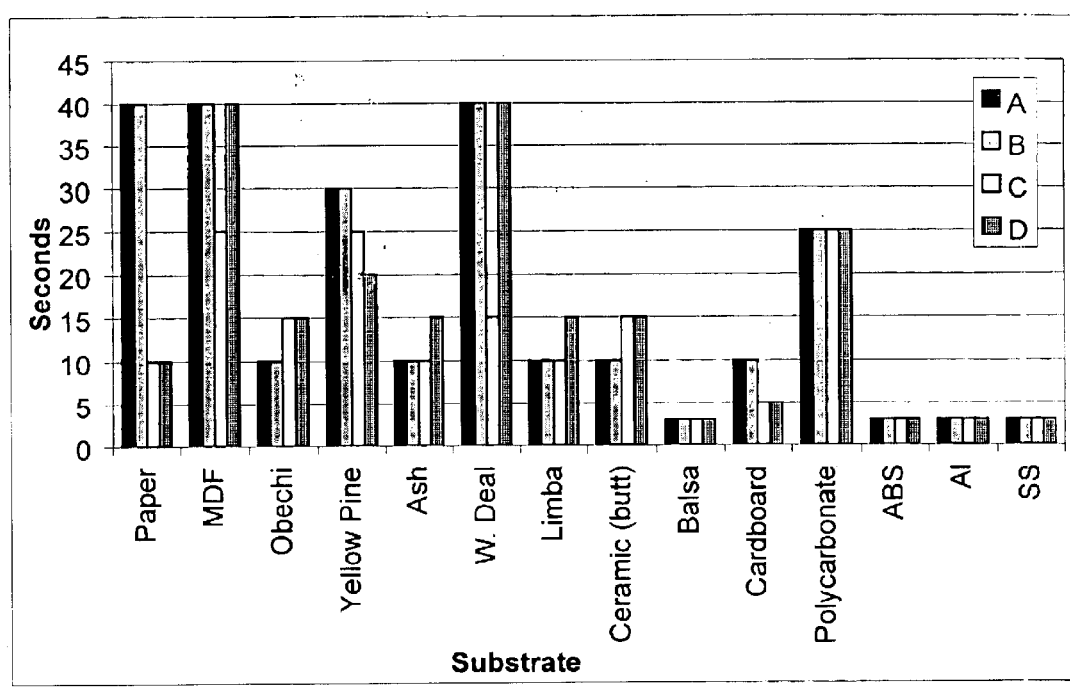
FIG. 1 shows a comparative chart of Samples A–D, where MDF is medium density fiberboard, ABS is acrylonitrile butadiene styrene copolymer, Al is aluminum and SS is stainless steel.

As noted above, this invention is directed to a cyanoacrylate-based composition, which includes beyond the cyanoacrylate component,

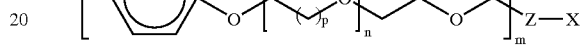

I, as an accelerator, where R is hydrogen, alkyl, alkyloxy, alkyl thioethers, haloalkyl, carboxylic acid and esters thereof, sulfinic, sulfonic and sulfurous acids and esters, phosphinic, phosphonic and phosphorous acids and esters thereof, X is optional, but when present is an aliphatic or aromatic hydrocarbyl linkage, which may be substituted by oxygen or sulfur, and Z is a single or double bond, such as

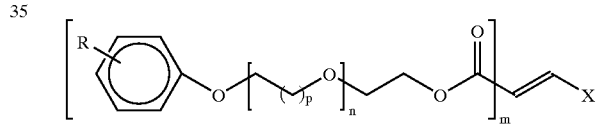

II, where R and X are as defined above.

For instance, a particularly desirable chemical class embraced by these structures is

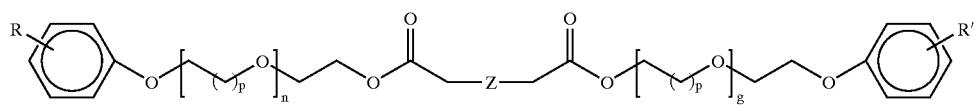

III, where R, Z and n are as defined above, and R' is the same as R, and g is the same as n.

A particularly desirable chemical within this class as an accelerator component is

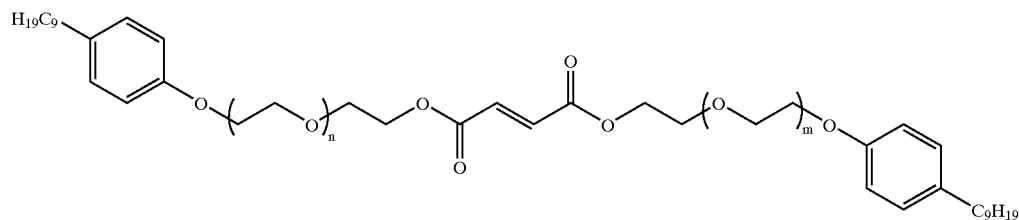

IV, where n and m combined are greater than or equal to 12.

The inclusion of such an accelerator into a cyanoacrylate composition provides for a demonstrated improved fixture speeds, particularly on substrates constructed of certain woods, such as obechi, and ceramic, and combinations thereof, without sacrificing shelf life.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 99.98% by weight, with the range of about 90% to about 99% by weight being desirable, and about 95% by weight of the total composition being particularly desirable.

In addition to the accelerator embraced by the chemical structures above, one or more additional accelerators may also be included in the composition. Such accelerators may be selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within structure V are useful herein:

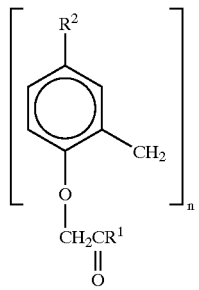

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4.arene ("TBTEOCA").

A host of crown ethers are known. For instance, examples which may be used herein either individually or in combination, or in combination with other first accelerators include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure (VI):

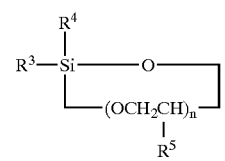

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

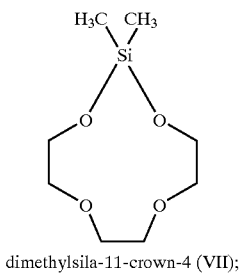

dimethylsila-11-crown-4 (VII);

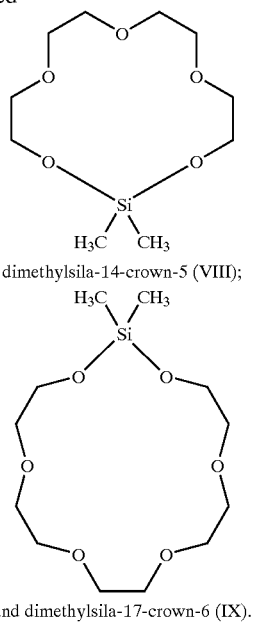

dimethylsila-14-crown-5 (VIII);

and dimethylsila-17-crown-6 (IX).

See e.g., U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include there within structure X below:

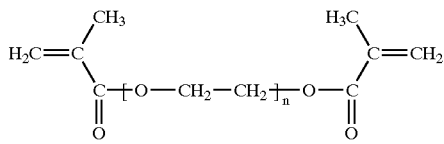

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within structure XI:

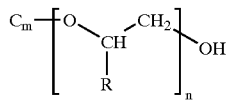

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within structure XI include those offered under the DEHYDOL tradename from Cognis Deutschland GmbH & Co. KG, Dusseldorf, Germany, such as DEHYDOL 100.

The accelerator embraced by structures I–IV should be included in the compositions in an amount within the range of from about 0.01% to about 10% by weight, with the range of about 0.1 to about 0.5% by weight being desirable, and about 0.4% by weight of the total composition being particularly desirable.

Additives may be included in the inventive compositions to confer additional physical properties, such as improved shelf-life stability, flexibility, thixotropy, increased viscosity, color, improved toughness, and enhanced resistance to thermal degradation. Such additives therefore may be selected from free radical stabilizers, anionic stabilizers, gelling agents, thickeners [such as polymethyl methacrylate (PMMA)], thixotropy conferring agents (such as fumed silica), dyes, toughening agents, thermal degradation enhancers, plasticizers and combinations thereof.

In another aspect of the invention, there is provided a method of bonding together two substrates, at least one of which is constructed of materials, such as certain woods, cotton and cork. The method includes applying to at least one of the substrates a composition as described above, and thereafter mating together the substrates for a time sufficient to permit the adhesive to fixture. For many applications, the substrate should become fixed in less than 30 seconds, and depending on substrate as little as 1–3 seconds.

In yet another aspect of the invention, there is provided reaction products of the so-described compositions.

In still another aspect of the invention, there is provided a method of preparing the so-described compositions. The method includes providing a cyanoacrylate component, and combining therewith with mixing a first and second accelerator component.

In an additional aspect of the invention, there is provided a method of bonding together two substrates, at least one of which is constructed of a material selected from the group consisting of wood, cotton and cork, using the compositions of this invention. The method includes applying the compositions to at least one of the substrates and mating together the substrates for a time sufficient to permit the composition to fixture.

These aspects of the invention will be further illustrated by the examples which follow.

EXAMPLES

We prepared four samples to evaluate their fixture speeds on a variety of substrates. The samples were prepared by mixing together the constituents in any order for a sufficient period of time to ensure substantial homogeneity of the constituents. Ordinarily, about 30 minutes would suffice, depending of course on the quantity of the constituents used. The constituents of these samples are listed below in Table 1.

TABLE 1

| Component | | Sample | | | |
|---|---|---|---|---|---|
| Type | Identity | A | B | C | D |
| CA | Ethyl-2-CA | 82.4983 | 82.4983 | 82.3983 | 82.3983 |
| Accelerator | Compound IV | 0.5 | 0.5 | 0.4 | — |
| | TBTEOCA | — | — | 0.2 | 0.2 |
| | PEG 400 DMA | — | — | — | 0.4 |
| Plasticizer | Glycerol triacetate | 12.5 | 12.5 | 12.5 | 12.5 |

TABLE 1-continued

| Type | Identity | A | B | C | D |
|---|---|---|---|---|---|
| Component | | Sample | | | |
| Stabilizer | HQ | 0.5 | 0.5 | 0.5 | 0.5 |
| Thickener | PMMA | 4.0 | 4.0 | 4.0 | 4.0 |

We applied each of Samples A–D to the substrates listed below in Table 2, and measured their fixture speeds in bonding the substrates (each being made from the same material) to one another. The fixture speed is the time from joining the two substrates (each of which being about 1 inch wide and being aligned with about a 0.5 inch overlap) sufficient to hold a 3 kg weight. The results are illustrated below in Table 2 and shown in FIG. 1.

TABLE 2

| Physical Properties | Substrate | Sample/(secs) | | | |
|---|---|---|---|---|---|
| | | A | B | C | D |
| Fixture Times | Paper | 40 | 40 | 10 | 10 |
| | MDF | 40 | 40 | 25 | 40 |
| | Obechi | 10 | 10 | 15 | 15 |
| | Yellow Pine | 30 | 30 | 25 | 20 |
| | Ash | 10 | 10 | 10 | 15 |
| | W. Deal | 40 | 40 | 15 | 40 |
| | Limba | 10 | 10 | 10 | 15 |
| | Ceramic/butt | 10 | 10 | 15 | 15 |
| | Balsa | 3 | 3 | 3 | 3 |
| | Cardboard | 10 | 10 | 5 | 5 |
| | Polycarbonate | 25 | 25 | 25 | 25 |
| | ABS | 3 | 3 | 3 | 3 |
| | Aluminum | 3 | 3 | 3 | 3 |
| | Stainless | 3 | 3 | 3 | 3 |

As can be seen from Table 2 and FIG. 1, Samples A and B (cyanoacrylate with compound IV) demonstrates improved fixture speeds on certain substrates, namely the woods, obechi; ash and limba, and ceramic, as compared with Sample D, which is the cyanoacrylate with the combination of the noted calixarenes and polyethylene glycol dimethacrylate.

In addition, the combination of the accelerator used in the present invention together with the noted calixarene (Sample C) improves fixture speed compared with the combination of the noted calixarene together with the noted polyethylene glycol dimethacrylate on certain substrates namely, MDF, ash, white deal and limba.

TABLE 3

| Physical Properties | Sample | | | |
|---|---|---|---|---|
| | A | B | C | D |
| Viscosity (MPas) | 32 | 32 | 34.4 | 34.1 |
| GBMS Bond Strength 24 hr. (N/mm2) | 13.57 +/− 1.56 | 12.70 +/− 1.54 | 13.86 +/− 1.00 | 12.70 +/− 1.15 |

The results shown in Table 3 illustrate that the inventive compositions (Samples A–C) behave as adhesives, yielding bond strength comparable to the control composition (Sample D), while demonstrating with reference to Table 2 improved fixture speeds on certain substrates, namely the woods, obechi, ash and limba, and ceramic.

In Table 4, stability data for Samples A–D filled in aluminum tubes and aged at 82° C. for the specified period of time is shown. The results in Table 4 demonstrate that the inventive compositions retain the benefits noted above even after ageing under the noted conditions.

TABLE 4

| Aged Data | Sample | | | |
|---|---|---|---|---|
| | A | B | C | D |
| 3 days @ 82° C. | | | | |
| Viscosity (Mps) | 36 | 35.7 | 35.8 | 36.5 |
| Ratio | 1.13 | 1.12 | 1.04 | 1.07 |
| Fixture time (secs) on paper | 40–50 | 40–50 | 5–10 | 10–15 |
| 6 days @ 82° C. | | | | |
| Viscosity (Mps) | 38.2 | 39.4 | 40.3 | 39.2 |
| Ratio | 1.19 | 1.23 | 1.17 | 1.15 |
| Fixture time (secs) on paper | 80–100 | 80–100 | 15–20 | 30–40 |

What is claimed is:

1. A cyanoacrylate adhesive composition comprising:

a cyanoacrylate component; and an accelerator represented by the following chemical structure

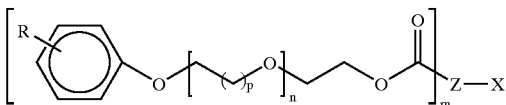

wherein R is a member selected from the group consisting of hydrogen, alkyl, alkyloxy, alkyl thioethers, haloalkyl, carboxylic acid and esters thereof, sulfinic, sulfonic and sulfurous acids and esters, phosphinic, phosphonic and phosphorous acids and esters thereof, X is an aliphatic or aromatic hydrocarbyl linkage, which may be substituted by oxygen or sulfur, Z is a single or double bond, n is 1–12, m is 1–4, and p is 1–3.

2. The composition of claim 1, wherein the accelerator is represented by the following chemical structure

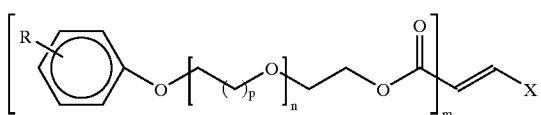

wherein R, X, n, m, and p are as defined above.

3. The composition of claim 1, wherein the accelerator is represented by the following chemical structure

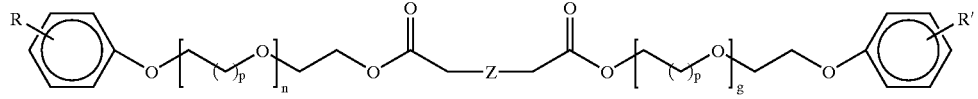

wherein R, Z, n, and p are as defined above, R' is the same as R, and g is 1–12.

4. The composition of claim 1, wherein the accelerator is represented by the following chemical structure

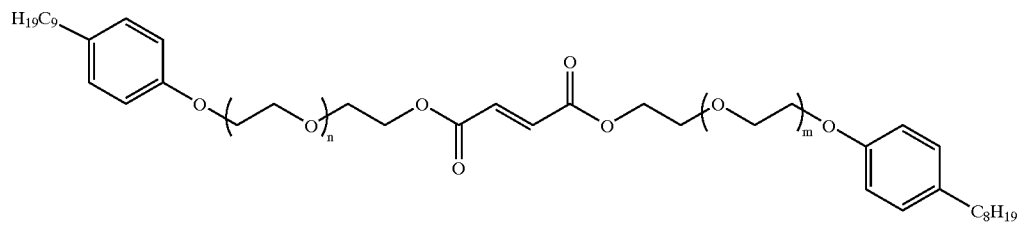

wherein n and m combined are greater than or equal to 12.

5. The composition according to claim 1, wherein the cyanoacrylate component is selected from materials within the structure $H_2C=C(CN)-COOR$, wherein R is selected from $C_{1-15}$ alkyl, alkoxyalkyl, cycloalkyl, alkenyl, aralkyl, aryl, allyl and haloalkyl groups.

6. The composition according to claim 1, wherein the cyanoacrylate component comprises ethyl-2-cyanoacrylate.

7. The composition according to claim 1, further comprising an additional accelerator component selected from the group consisting of calixarenes, oxacalixarenes, silacrowns, cyclodextrins, crown ethers, poly(ethyleneglycol) di(meth)acrylates, ethoxylated hydric compounds, and combinations thereof.

8. The composition according to claim 1, wherein the accelerator is used in an amount within the range of from about 0.01% by weight to about 5% by weight based on the total composition.

9. The composition according to claim 7, wherein the additional accelerator component is used in an amount within the range of from about 0.01% by weight to about 5% by weight based on the total composition.

10. The composition according to claim 1, further comprising additives selected from the group consisting of free radical stabilizers, anionic stabilizers, plasticizers, thixotropy conferring agents, thickeners, dyes, toughening agents, thermal degradation enhancers, and combinations thereof.

11. Reaction products of the composition according to claim 1.

12. A method of bonding together two substrates, at least one of which is constructed of a material selected from the group consisting of wood and ceramic, comprising the steps of:

applying a cyanoacrylate-containing adhesive composition according to claim 1, to at least one of the substrates and mating together the substrates for a time sufficient to permit the adhesive to fixture.

13. A method of preparing a cyanoacrylate-containing composition according to claim 1, comprising the steps of:

providing a cyanoacrylate component, and combining therewith with mixing an accelerator component.

* * * * *